United States Patent
Yamagishi et al.

(10) Patent No.: US 6,257,184 B1
(45) Date of Patent: Jul. 10, 2001

(54) APPARATUS AND METHOD FOR DIAGNOSING OF A HYDRAULIC VARIABLE VALVE TIMING MECHANISM

(75) Inventors: Youichiro Yamagishi; Satoru Watanabe, both of Atsugi (JP)

(73) Assignee: Unisia Jecs Corporation, Kanagawa-Ken (JP)

(*) Notice: Subject to any disclaimer, the term of this patent is extended or adjusted under 35 U.S.C. 154(b) by 0 days.

(21) Appl. No.: 09/366,718

(22) Filed: Aug. 4, 1999

(30) Foreign Application Priority Data

Aug. 10, 1998 (JP) .................................. 10-225727
Aug. 10, 1998 (JP) .................................. 10-225728
Aug. 25, 1998 (JP) .................................. 10-238524

(51) Int. Cl.⁷ ........................................ F01L 1/34
(52) U.S. Cl. ................... 123/90.15; 123/90.16; 123/90.17
(58) Field of Search ........................ 123/90.12, 90.13, 123/90.15, 90.16, 90.17, 90.46, 90.55, 90.63

(56) References Cited

U.S. PATENT DOCUMENTS

| | | | |
|---|---|---|---|
| 5,080,052 | * | 1/1992 | Hotta et al. .............. 123/90.17 |
| 5,090,365 | * | 2/1992 | Hotta et al. .............. 123/90.17 |
| 5,529,034 | * | 6/1996 | Sone et al. .............. 123/90.17 |
| 5,537,961 | * | 7/1996 | Shigeru et al. .......... 123/90.15 |
| 5,937,808 | * | 8/1999 | Kako et al. .............. 123/90.15 |
| 5,979,378 | * | 11/1999 | Matsuno et al. ........ 123/90.15 |
| 6,032,623 | * | 3/2000 | Yamagishi et al. ..... 123/90.15 |
| 6,047,674 | * | 4/2000 | Kadowaki et al. ...... 123/90.15 |
| 6,085,706 | * | 7/2000 | Kadowaki et al. ...... 123/90.15 |
| 6,094,974 | * | 8/2000 | Yamagishi et al. ..... 123/90.16 |
| 6,109,225 | * | 8/2000 | Ogita et al. ............. 123/90.15 |

FOREIGN PATENT DOCUMENTS 7-233713 9/1995 (JP) .
8-246820 9/1996 (JP) .

* cited by examiner

Primary Examiner—Teresa Walberg
Assistant Examiner—Fadi H. Dahbour
(74) Attorney, Agent, or Firm—McDermott, Will & Emery

(57) ABSTRACT

With a variable valve timing mechanisms which changes an open-close timing of an intake valve and/or an exhaust valve in a vehicle engine by using oil pressure to change the rotational phase of a cam shaft with respect to a crank shaft, a delay time is determined in accordance with engine rotational speed, cooling water temperature and the amplitude of a change in the target rotational phase, and fault diagnosis which is performed by comparing the target rotational phase and the actual rotational phase is prohibited for the period of the delay time from after a stepwise change in the target rotation phase.

24 Claims, 11 Drawing Sheets

APPARATUS AND METHOD FOR DIAGNOSING OF A HYDRAULIC VARIABLE VALVE TIMING MECHANISM

BACKGROUND OF THE INVENTION

1. Field of the Invention

The present invention relates to an apparatus and method for diagnosing a hydraulic variable valve timing mechanism, and in particular to technology for diagnosing a fault in a hydraulic variable valve timing mechanism in which the valve timing is changed by oil pressure.

2. Description of the Related Art

Variable valve timing mechanisms which advance or retard the open-close timing of an intake valve and/or an exhaust valve in a vehicle engine by using oil pressure to change the rotational phase of a cam shaft with respect to a crank shaft have been previously reported (refer to Japanese Unexamined Patent Publication No. 7-233713 and Japanese Unexamined Patent Publication No. 8-246820).

However, with the conventional variable valve timing mechanism mentioned above, when a fault diagnosis is conducted by comparing a target valve timing (target rotational phase) and an actual valve timing (actual rotational phase), various problems can arise, as detailed below.

With a hydraulic variable valve timing mechanism, a stepwise change of the target valve timing results in the actual valve timing gradually approaching the changed target due to a response delay in the oil pressure.

As a result, the problem arises that a comparison of the actual valve timing with the target valve timing immediately following a stepwise change of the target valve timing, produces a misdiagnosed fault based on the existence of a relatively large deviation between the two values.

In particular, if the oil drains out of the hydraulic chamber of the variable valve timing mechanism during the engine is stopped, then the first change of the valve timing following engine start-up will require the hydraulic chamber to be refilled with oil in order to generate the oil pressure necessary for changing the valve timing. Therefore, in relation to the valve timing change command the actual valve timing will change even more slowly than normal, increasing the possibility of a misdiagnosed fault.

Furthermore, in those cases where the actual valve timing is detected as the rotational phase of a cam shaft with respect to a crank shaft, then for example when a construction is used wherein a plate supported on the cam shaft incorporates a plurality of detection portions which are detected by an electromagnetic pickup detector or a Hall element detector, then due to deviations in the positions of the detection portions, deviations develop in the detection results for the rotational phase values at each detection portion even though the valve timing (rotational phase) is actually constant. Consequently the possibility arises that the detected value for the rotational phase may temporarily exceed the fault judgment level resulting in a misdiagnosed fault.

SUMMARY OF THE INVENTION

The present invention takes the above problems into consideration, with the object of providing an apparatus and a method for diagnosing a hydraulic variable valve timing mechanism, wherein misdiagnoses resulting from a response delay in the actual rotational phase with respect to a change of the target rotational phase can be avoided, while opportunities for conducting diagnoses can still be maintained.

Furthermore, another object is to provide a diagnosis apparatus and method wherein even in those cases where the oil has drained out during the engine was stopped, a misdiagnosis during the first valve timing change following start-up can be avoided, while opportunities for conducting diagnoses can still be maintained at a sufficient level.

Moreover, yet another object is to provide a diagnosis apparatus and method wherein even in those cases where a deviations exists in the detection results for the rotational phase values, misdiagnosis of a fault will not result.

In order to achieve the above objects, the present invention employs a construction where the presence of a fault is judged from the results of a comparison between a detection value of the rotational phase of a cam shaft with respect to a crank shaft and a target value for the rotational phase, and a fault judgment signal is then output. The time period for where a response delay in the rotational phase occurs with respect to the change in the target value is estimated in accordance with the operating conditions, and the output of the fault judgment signal is prevented for the duration of the thus estimated time period.

With such a construction, because diagnosis (output of a fault judgment signal) is prevented during the period for where a response delay occurs in the rotational phase, even if a large deviation develops between the actual rotational phase and the target value due to a response delay, a misdiagnosis will not occur. Furthermore, because the time period for where a response delay occurs is estimated in accordance with the operating conditions, even if the response characteristics vary due to the operating conditions, diagnosis (output of a fault judgment signal) can be prevented for just the period during which a response delay occurs.

The response delay time period required for the rotational phase to reach the target value following a change of the target value can be estimated in accordance with the rotational speed of the engine, with diagnosis (output of a fault judgment signal) then being prevented for the duration of the thus estimated time period.

With such a construction, in the case where the pump which supplies hydraulic fluid to the hydraulic variable valve timing mechanism is driven by an engine, the discharge capacity of the pump will vary in proportion to the engine rotational speed, resulting in a change in the response characteristics of the oil pressure. Therefore the response delay time period can be estimated in accordance with the change in the response characteristics of the oil pressure due to the engine rotational speed.

Furthermore, the response delay time period required for the rotational phase to reach the target value following a change of the target value can also be estimated in accordance with the temperature of the hydraulic fluid, with diagnosis (output of a fault judgment signal) then being prevented for the duration of the thus estimated time period.

With such a construction, since the viscosity of the hydraulic fluid changes in accordance with the temperature of the fluid, and the response characteristics of the oil pressure changes with the change in the viscosity, the response delay time period is estimated in accordance with the change in the response characteristics of the oil pressure due to the temperature of the hydraulic fluid.

Furthermore, the response delay time period required for the rotational phase to reach the target value following a change of the target value can also be estimated in accordance with the amplitude of the change in the target value, with diagnosis (output of a fault judgment signal) then being prevented for the duration of the thus estimated time period.

With such a construction, the greater the amplitude of the change in the target rotational phase the longer the length of time required for the actual rotational phase to reach the target. Therefore the response delay time period can be estimated in accordance with the change in the response time due to the amplitude of the change in the target.

Moreover, the response delay time period required for the rotational phase to reach the target value following a change of the target value can also be estimated based on whether or not the change in the target value is the first change following start-up of the engine, with diagnosis (output of a fault judgment signal) then being prevented for the duration of the thus estimated time period.

With such a construction, when the rotational phase target is changed for the first time following engine start-up there is a possibility that the hydraulic chamber, which may have drained during the time the engine was stopped, will require refilling with oil, which will result in the response delay time period being even longer than normal. Therefore by determining whether or not the change in the target value is the first change following start-up of the engine, diagnosis (output of a fault judgment signal) can be prevented for a time period which takes into account the additional response delay resulting from the aforementioned oil filling step.

Furthermore, the time period required for oil pressure inside a hydraulic chamber of the hydraulic variable valve timing mechanism to exceed a reference oil pressure can be estimated as the time period during which a response delay occurs, with diagnosis (output of a fault judgment signal) then being prevented for the duration of the thus estimated time period.

With such a construction, in the case where the oil pressure inside the hydraulic chamber will remain low until the chamber is refilled after the oil has drained from the hydraulic chamber while the engine has been stopped and the rotational phase target is then changed for the first time following engine start-up, the time period required for the oil pressure to exceed the reference oil pressure can be judged to be the time required for the chamber to be refilled, and diagnosis (output of a fault judgment signal) can be prevented for this time period.

With a construction such as that described above where fault diagnosis is conducted by comparing the rotational phase detection value with a target value, it is preferable to have a construction wherein diagnosis of the occurrence of a fault in the variable valve timing mechanism is finally diagnosed a fault judgment signal is output when greater than or equal to a predetermined number of fault judgments are made consecutively.

With such a construction, when the rotational phase detection value is compared with the target value, even if a large deviation exists between the two values, a fault judgment signal is not output immediately but rather is output only when a large deviation is detected continuously.

Moreover, a construction may be such that there is provided a cam sensor which receives a plurality of rotational signals for each cycle from the cam shaft, and a crank angle sensor which receives a rotational signal from the crank shaft, and the phase difference between the rotational signals from the cam sensor and the rotational signal from the crank angle sensor is detected as the aforementioned rotational phase.

With such a construction, the cam sensor is a sensor which receives a plurality of rotational signals for each cycle of the cam shaft, which requires the provision of a plurality of detection portions. When there is a deviation in the positions of the detection portions, a deviation develops in the rotational phase values detected. However, provided the detection result for the rotational phase does not continuously exceed the fault judgment level, a final fault judgment will not be made.

Moreover, when judging the number of fault judgments, it is preferable to use a construction wherein a counter is increased each time a fault judgment is made, with the counter being cleared when a normality judgment is obtained, and a fault judgment signal is output only when the value of the counter equals to or exceeds a predetermined value.

With such a construction, the value in the counter is increased with each fault judgment which is made based on the detection results for the rotational phase. However by clearing the counter when a normality judgment is obtained, the counter represents the number of consecutive fault judgments, so that when the value of the counter equals to or exceeds the predetermined value, the number of consecutive fault judgments has also been the predetermined value or more.

Other objects and aspects of the present invention will become apparent from the following description of embodiments given in conjunction with the appended drawings.

DESCRIPTION OF THE PREFERRED EMBODIMENTS

Figure 1:
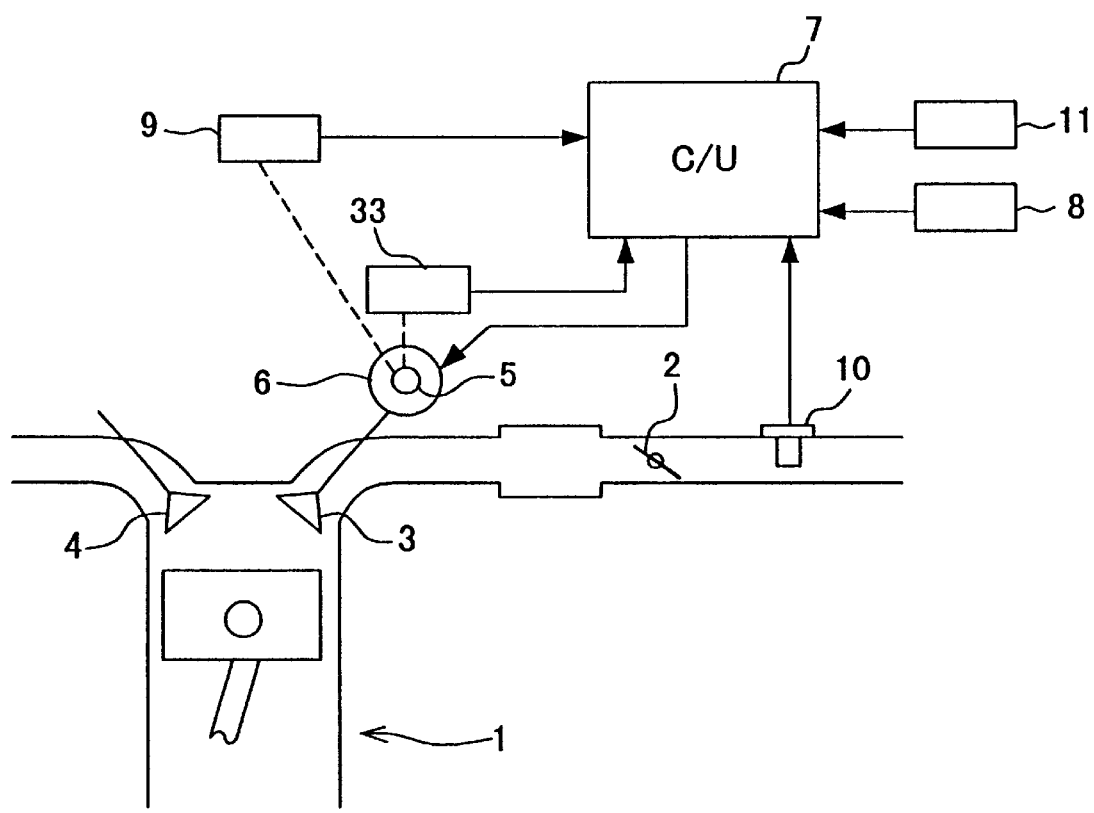
FIG. 1 is a diagram showing a construction of an engine system.

FIG. 1 is a diagram showing the construction of an engine system equipped with a hydraulic variable valve timing mechanism.

With an engine 1 shown in FIG. 1, air which has been metered by a throttle valve 2 passes through an intake valve 3 and into a cylinder, with combustion exhaust gas being discharged through an exhaust valve 4. The intake valve 3 and the exhaust valve 4 are driven to open and close by cams which are provided on an intake cam shaft and an exhaust cam shaft respectively.

The intake cam shaft 5 is provided with a variable valve timing mechanism 6 which, by changing the rotational phase of the cam shaft with respect to a crank shaft, can continuously change the open-close timing of the intake valve 3 while the open-close angle (the operating angle) remains constant.

The variable valve timing mechanism 6 is a hydraulic mechanism which continuously changes the rotational phase by means of oil pressure supplied by a hydraulic pump. It controls respectively the oil pressure acting in the phase advance direction of the rotational phase and the oil pressure acting in the phase retard direction of the rotational phase, to control the rotational phase of the intake cam shaft 5 towards a target rotational phase. Furthermore the construction is such that the oil pressure can be adjusted by means of an oil pressure control signal from a control unit 7.

Moreover, the variable valve timing mechanism 6 is provided with mechanical stoppers in both the phase advance and phase retard directions of the rotational phase for controlling the change of the rotational phase. Positions of maximum phase advance and maximum phase retard are controlled by the position of the stoppers.

The phase retard direction of the rotational phase of the intake cam shaft 5 is the direction which leads to a delay in the opening of the intake valve 3 to reduce the degree of overlap between the exhaust valve 4 and the intake valve 3, whereas the phase advance direction is the direction which leads to an early opening of the intake valve 3 to increase the degree of overlap between the exhaust valve 4 and the intake valve 3.

Figure 2:
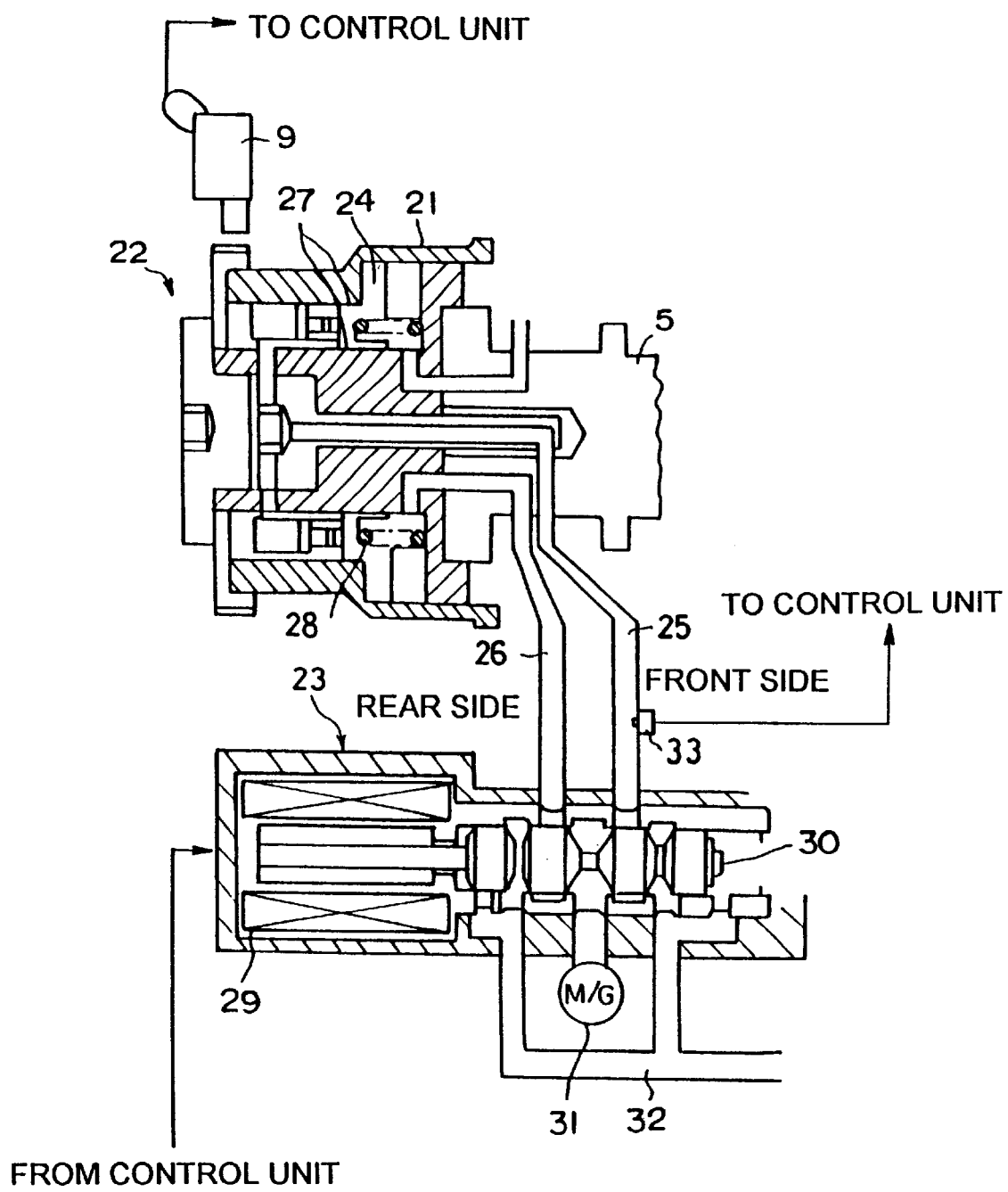
FIG. 2 is a partial cross-sectional view showing a variable valve timing mechanism.

The variable valve timing mechanism 6 is attached as shown in FIG. 2, to a cam sprocket 21 of the intake cam shaft 5, and comprises a phase adjustment mechanism 22 for changing the phase between the crank shaft and the intake cam shaft 5, and a control valve 23 for controlling the supply of oil pressure to the phase adjustment mechanism 22.

The phase adjustment mechanism 22 is provided with a front hydraulic passage 25 for supplying oil pressure to the front side (the left side in FIG. 2) of a plunger 24 housed inside the cam sprocket 21, and a rear hydraulic passage 26 for supplying oil pressure to the rear side (the right side in FIG. 2) of the plunger 24.

The plunger 24 engages with the cam sprocket 21 and the intake cam shaft 5 via a helical gear 27, and due to a balance in the oil pressure supplied to the front side and the oil pressure supplied to the rear side, the plunger 24 moves along an axial direction of the cam shaft 5 while rotating. At this time, because the cam sprocket 21 is fixed by a timing chain (or a timing belt) which is not shown in the figure, the cam shaft 5 side rotates together with the plunger 24, so that the phase position between the cam sprocket 21 and the cam shaft 5 changes. With the present embodiment, if the plunger 24 is moved towards the cam shaft 5 (towards the right in FIG. 2) the rotational phase of the cam shaft 5 will change towards the phase advance direction, whereas in contrast if the plunger 24 is moved away from the cam shaft 5 (towards the left in FIG. 2) the rotational phase of the cam shaft 5 will change towards the phase retard direction.

Furthermore, a return spring 28 is provided which urges the plunger 24 away from the cam shaft (to the phase retard side).

The control valve 23 which controls the supply of oil pressure to the front side and rear side of the plunger 24 comprises a linear solenoid 29 and a spool valve 30. By using the linear solenoid 29 to change the position of the spool valve 30, the supply of oil pressure to the front side of the plunger 24 via the front hydraulic passage 25 and to the rear side of the plunger 24 via the rear hydraulic passage 26 can be controlled.

The switching ON and OFF of the linear solenoid 29 is duty controlled by the control unit 7. When the duty ratio (the proportion of time set to the ON position) is 0% (power supply halted) oil pressure is supplied exclusively to the rear side of the plunger 24 while oil pressure is drained from the front side so that the cam shaft 5 is held at the position of maximum phase retard (the position of minimum overlap). On the other hand, when the duty ratio is 100% (continuous power supply) oil pressure is supplied exclusively to the front side of the plunger 24 while oil pressure is drained from the rear side so that the cam shaft 5 is held at the position of maximum phase advance (the position of maximum overlap). By varying the duty ratio within the range 0~100% the balance between the oil pressure at the front side and the rear side can be changed to generate a target position somewhere between the position of maximum phase advance and that of maximum phase retard.

Moreover in FIG. 2, numeral 31 denotes an oil pressure source (an engine driven oil pump) and numeral 32 denotes a drain passage from the spool valve 30.

Furthermore as shown in FIG. 2, a cam sensor 9 is provided for outputting a detection signal at a predetermined angle position of the cam shaft 5.

Moreover a crank angle sensor 8 is provided for outputting a detection signal at a predetermined angle position of the crank shaft Based on the detection signals from the crank angle sensor 8 and the cam sensor 9, the control unit 7 (phase detection device) detects the rotational phase of the cam shaft 5 with respect to the crank shaft, and then detects the open-close timing of the intake valve 3 and calculates the rotational speed Ne of the engine 1 based on the detection signal from the crank angle sensor 8.

Figure 3:
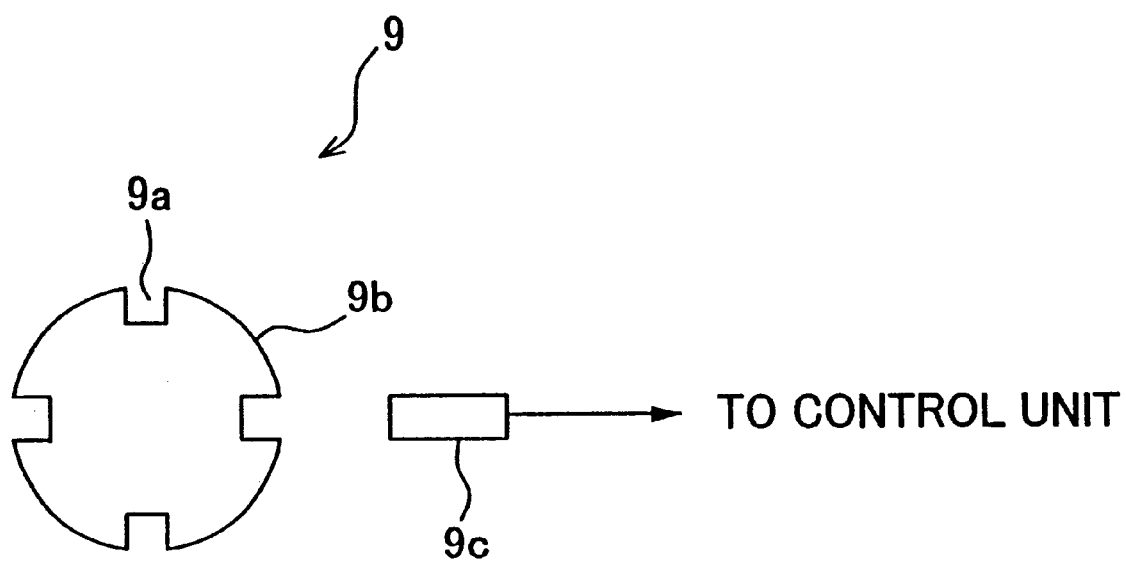
FIG. 3 is a diagram showing the construction of a cam sensor.

As shown in FIG. 3, the cam sensor 9 comprises a plate 9b supported on the cam shaft 5, which incorporates a series of indentations 9a formed every 90° which function as detection portions, and a Hall element detection apparatus 9c for detecting the indentations 9a. The engine 1 of the present embodiment is an in-line 4 cylinder engine, and the 90° spacing between the indentations 9a corresponds with the 180° crank angle. The 180° crank angle matches the stroke phase difference between each cylinder. The crank angle sensor 8 outputs a detection signal every 180° of the crank angle (refer to FIG. 4). Consequently, by measuring the angle difference between the detection signal from the cam sensor 9 and the detection signal from the crank angle sensor 9 the rotational phase of the cam shaft 5 with respect to the crank shaft can be detected.

The control unit 7 receives input not only of the detection signals from the crank angle sensor 8 and the cam sensor 9, but also of the detection signals from sensors such as an air flow meter 10 for detecting the air intake quantity of the engine 1 and a water temperature sensor 11 for detecting the cooling water temperature Tw.

Then, based on information such as the engine load, the engine rotational speed Ne and the cooling water temperature Tw, the control unit 7 determines a target phase advance value for the phase of the cam shaft 5 (a rotational phase target value) and outputs to the linear solenoid 29, a duty hydraulic control signal corresponding to the target phase advance value.

Figure 5:
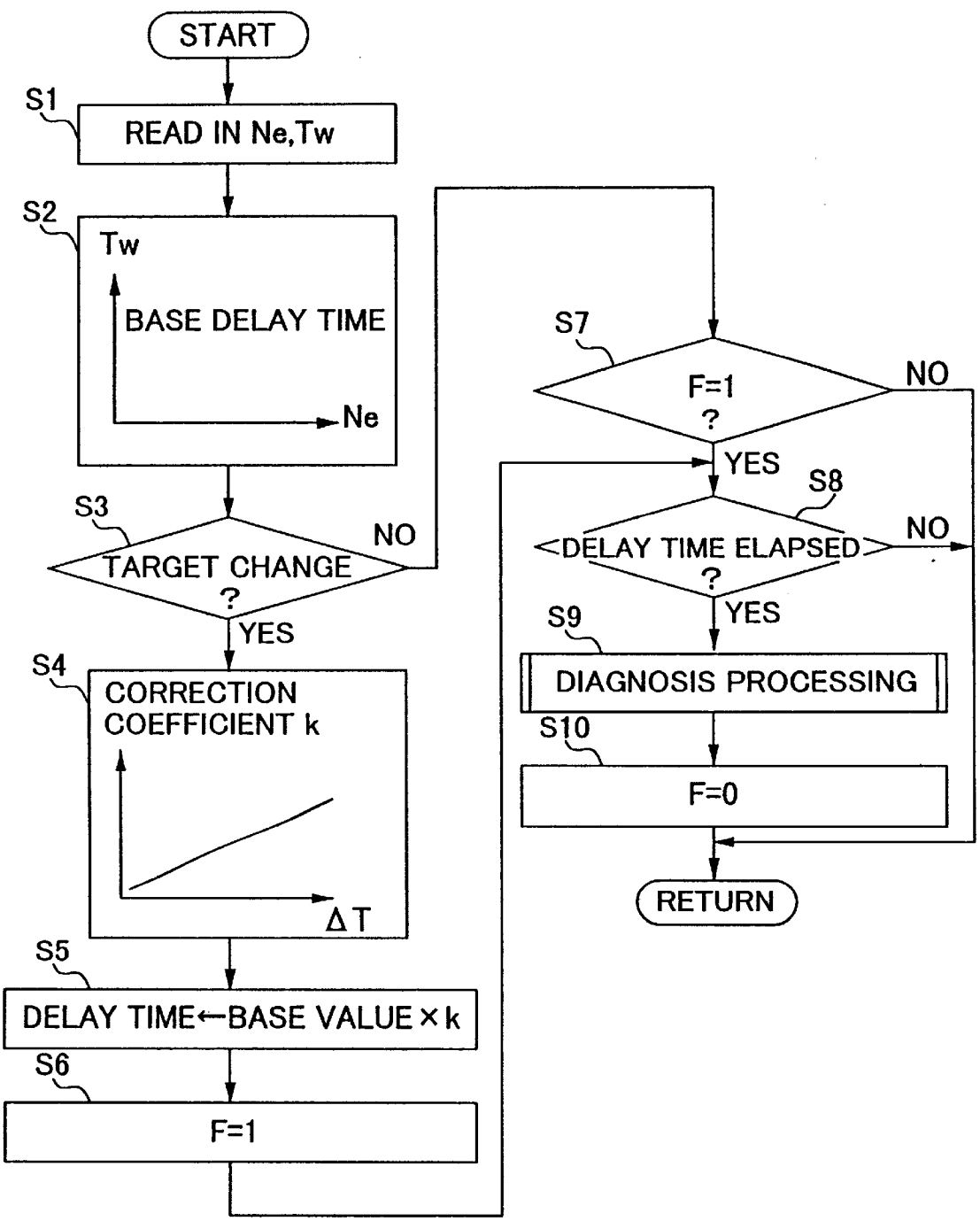
FIG. 5 is a flow chart showing the contents of the processing in a fault diagnosis of a first embodiment.
Figure 6:
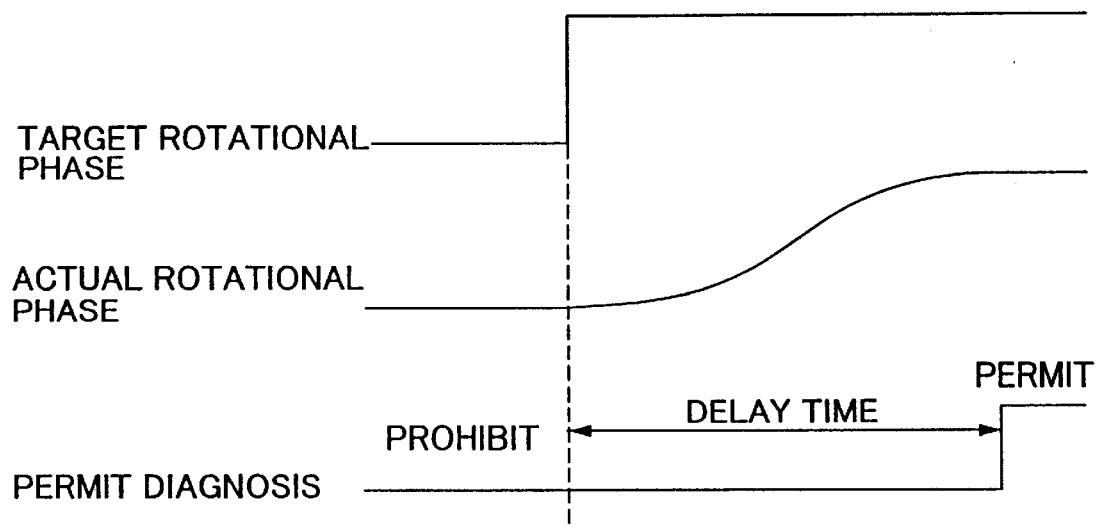
FIG. 6 is a time chart showing the timing of a diagnosis.

The control unit 7, is also equipped with software as shown in the flow chart in FIG. 5, for conducting fault diagnoses on the variable valve timing mechanism 6. This fault diagnosis function is described below.

In step S1 of the flowchart shown in FIG. 5, the rotational speed Ne of the engine and the cooling water temperature Tw are read in.

In step S1, the cooling water temperature Tw is used as a temperature which correlates with the temperature of the hydraulic fluid of the variable valve timing mechanism 6. However, it is also possible to provide an oil temperature sensor for detecting the temperature of the hydraulic fluid directly and then use the results from the oil temperature sensor instead of the cooling water temperature Tw.

In step S2, reference is made to a map containing pre-stored basic delay times corresponding to various engine rotational speeds Ne and cooling water temperature Tw, and the basic delay time corresponding to the engine rotational speed Ne and the cooling water temperature Tw read in at step S1 is retrieved.

The basic delay time is the base value for the delay time from when the target rotational phase undergoes a stepwise change until a diagnosis is conducted.

The diagnosis is conducted on the basis of whether or not the deviation between the target value and the actual rotational phase equals to or exceeds a predetermined value. In the case where the target rotational phase has undergone a stepwise change, the actual rotational phase will gradually approach a new target after undergone the stepwise change, and during the resulting response delay period a large deviation will exist between the target value and the actual rotational phase. Consequently, if a diagnosis is conducted during the response delay period, a fault judgment is made even though there is actually no fault. Hence, the response delay period, from when a stepwise change is made in the target rotational phase until the point where the actual rotational phase has sufficiently approached the target value, is estimated (estimation device) as a delay time in accordance with the operating conditions, and diagnosis is not conducted until the delay time has elapsed.

When the engine rotational speed Ne is high and the discharge capacity of the hydraulic pump which constitutes the variable valve timing mechanism 6 is large, the response to oil pressure changes is fast and the response of the rotational phase is also quick. Therefore, the basic delay time (response delay period) is set to be shorter when the engine rotational speed Ne is higher. Furthermore, when it is assumed that the cooling water temperature Tw is low and so the temperature of the hydraulic fluid is also low, because the viscosity of the hydraulic fluid is low and leakage from the hydraulic passages is minimal, the response to oil pressure changes is quicker than when the oil temperature is high. Hence the basic delay time (response delay period) is set to be shorter when the cooling water temperature Tw (oil temperature) is lower.

In step S3, a judgment is made as to whether or not a stepwise change has occurred in the target rotational phase (valve timing).

Then, if there has been a stepwise change in the target rotational phase, control proceeds to step S4 where a correction coefficient k for correcting for the basic delay time is set in accordance with the change amplitude ΔT in the target rotational phase. The larger the change amplitude ΔT is, the longer the delay time (response delay period) required will be for reaching the target value. Hence the correction coefficient k is set so that larger change amplitudes ΔT generates larger corrections applied to the basic delay time.

In step S5, the basic delay time is multiplied by the correction coefficient k and the resulting value is set as a final delay time.

In step S6, a flag F is set to value 1 to indicate that a stepwise change of the target rotational phase has just occurred.

Following step S6, control proceeds to step S8 where a judgment is made as to whether or not the delay time has elapsed. In the case where the delay time has not yet elapsed the routine ends without a diagnosis being conducted, so that diagnoses (outputs of fault judgment signals) during the delay time are prevented (diagnosis prevention device).

Next time through the routine, step S3 determines that no stepwise change of the target rotational phase has occurred and control proceeds to step S7 where the value of the flag F is checked. Since the flag F was set to 1, control proceeds from step S7 to step S8 where a second judgment is made as to whether or not the delay time has elapsed.

If the judgment is made at step S8 that the delay time has elapsed then control proceeds to step S9 where diagnosis processing is conducted.

The diagnosis processing detects the actual rotational phase difference between the crank shaft and the cam shaft based on the detection signals from the crank angle sensor 8 and the cam sensor 9, and in the case where the absolute value of the deviation between the detected actual rotational phase difference and the target rotational phase equals to or exceeds a predetermined value, judges that a fault has occurred to output a fault judgment signal.

Figure 7:
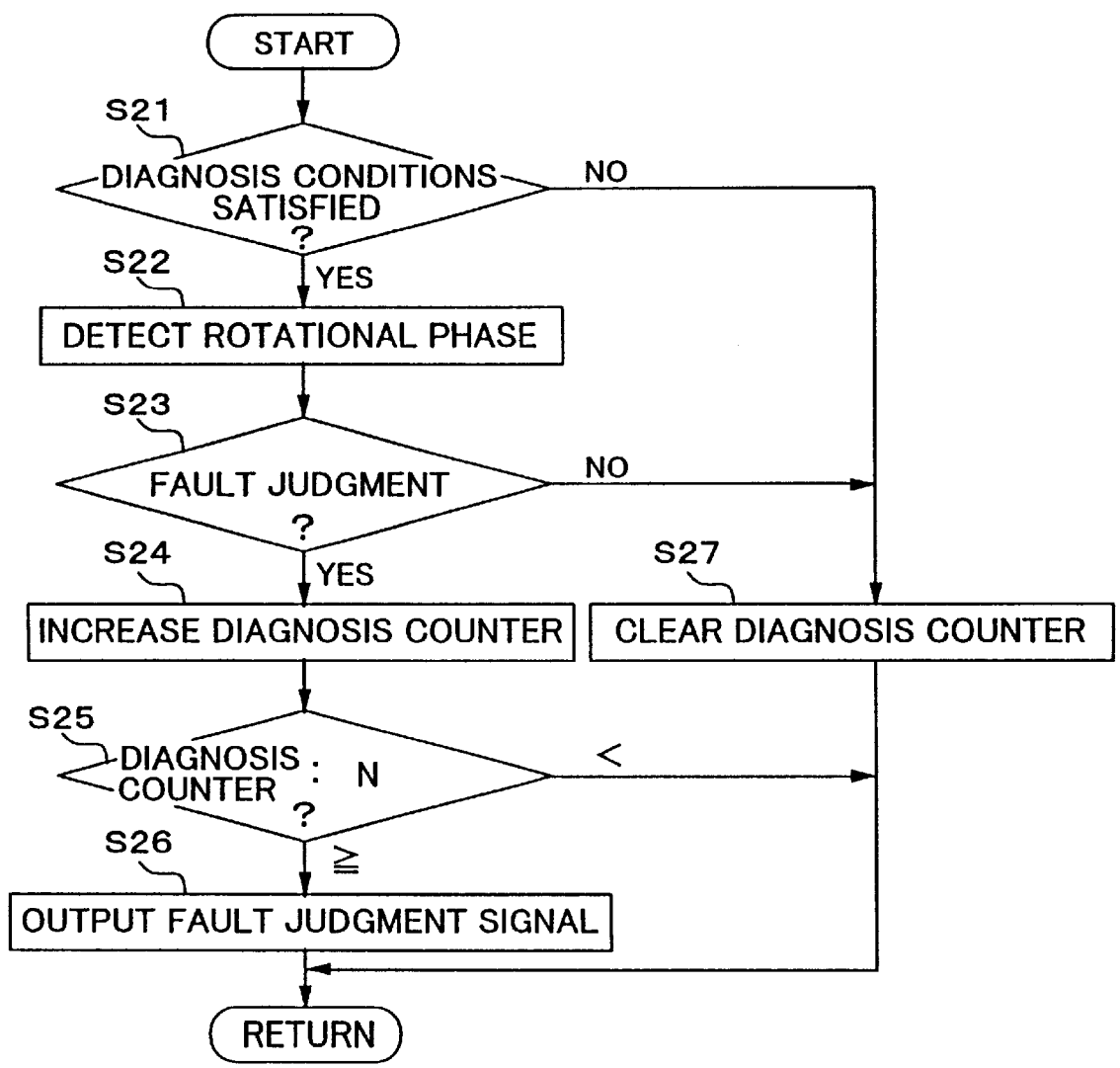
FIG. 7 is a flow chart showing details of an output control for a fault judgment signal.

Details of the diagnosis are shown in the flowchart of FIG. 7.

In the flowchart of FIG. 7, at step S21 a judgment is first made as to whether or not the diagnosis conditions have been satisfied. The diagnosis conditions include the requirement described above that the predetermined delay time following a stepwise change of the target rotational phase has elapsed.

In those cases where the diagnosis conditions have not been satisfied control proceeds to step S27 where, as described below, the diagnosis counter used for counting the number of fault judgments is cleared and the routine ends.

On the other hand, if the diagnosis conditions are judged to have been satisfied control proceeds to step S22 (phase detection device) where the rotational phase of the cam shaft 5 is detected.

Figure 4:
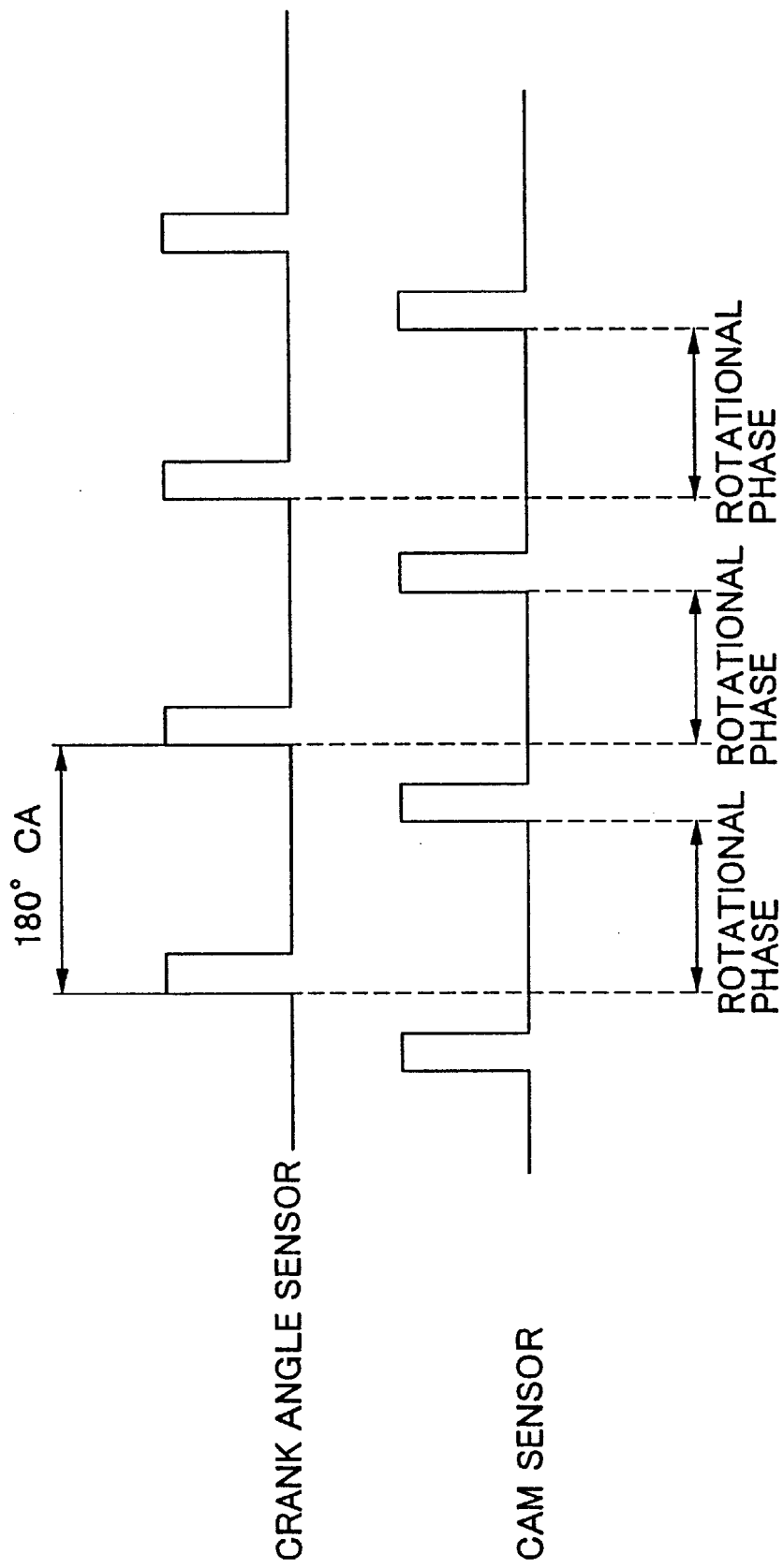
FIG. 4 is a time chart showing the characteristics of detection signals from a cam sensor and a crank angle sensor.

As shown in FIG. 4, the detection of the rotational phase of the cam shaft is conducted by measuring the time period from when a detection signal is generated at the crank angle sensor 8 until a detection signal is generated at the cam sensor 9, and then converting the time period to an angle equivalent based on the engine rotational speed at the time (phase difference detection device). With the present embodiment, because four detection signals are output from the cam sensor 9 per one cycle (per one rotation of the cam shaft 5), the rotational phase is detected four times per cycle with each detection being based on one of the four indentations 9*a* in the cam sensor 9.

In step S23 a fault judgment is conducted for the variable valve timing mechanism based on whether or not the absolute value of the deviation between the rotational phase detected at step S22 and the target rotational phase equals to or exceeds a predetermined value (diagnosis device).

Here, if the absolute value of the deviation exceeds the predetermined value so that a fault is judged to have occurred in the variable valve timing mechanism, then control proceeds to step S24 where the diagnosis counter is increased by one (count-up device), whereas if the absolute value of the deviation is less than the predetermined value and the actual rotational phase and the target value are approximately equal then control proceeds to step S27 where the diagnosis counter is cleared (reset to zero) (clearing device). Thus, the diagnosis counter totals the number of consecutive fault judgments made.

Once the diagnosis counter has been increased by one at step S24, control proceeds to step S25 where a judgment is made as to whether or not the total count of the diagnosis counter reaches or exceeds a predetermined value N. In the case where the total count of the diagnosis counter does reach or exceed the predetermined value N control proceeds to step S26 where a final fault judgment is made for the variable valve timing mechanism 6 and a fault judgment signal is output.

Preferably, based on the output of the fault judgment signal, a warning of a fault in the variable valve timing mechanism 6 is displayed at the driver's seat of the vehicle in which the engine 1 is mounted, and a log of fault judgments is stored in the control unit 7.

Figure 8:
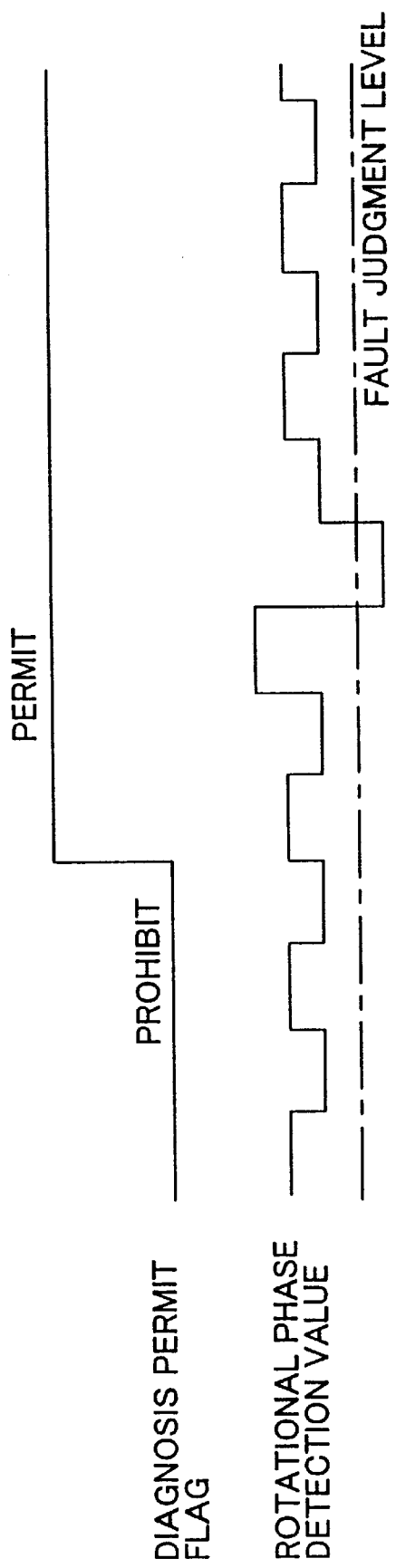
FIG. 8 is a time chart showing deviations in detection values of rotational phase.

If a construction such as that described above is employed, where a fault diagnosis signal is only output once the number of consecutive fault judgments reaches or exceeds a predetermined value N, then as shown in FIG. 8, the deviation in the locations of the aforementioned indentations 9a will generate a deviation in the rotational phase detected at each indentation 9a, and even if the deviation leads temporarily to the detection of an abnormal rotational phase, a final fault diagnosis is not made based on the detection of the abnormal rotational phase and thus misdiagnoses resulting from the deviation can be prevented.

It should be apparent that the construction of the cam sensor 9 is not limited to the construction shown in FIG. 3.

Following completion of the diagnosis processing at step S9, control proceeds to step S10 where the flag F is reset to zero. Consequently, until the next stepwise change of the target rotational phase occurs, the value of the flag F will be judged to be zero at step S7, and so the routine will end without a diagnosis being conducted.

With the construction described above, once the delay time has elapsed following a stepwise change of the target rotational phase, the actual rotational phase is estimated to have reached the level of the target rotational phase, and in the case where the actual rotational phase does not approximately match the target value, a fault is judged to have occurred. However, because the delay time is changed corresponding to the difference in oil pressure response during the period until the target is reached, due to the engine rotational speed Ne, the cooling water temperature Tw (oil temperature) and the amplitude ΔT of the stepwise change in the target rotational phase, if the response is normal, then a diagnosis can be conducted at a time close to the shortest time required for the target to be reliably reached. Hence, the accuracy of the diagnosis can be maintained while maximizing the opportunities for diagnoses.

With the embodiment described above, the engine rotational speed Ne, the cooling water temperature Tw (oil temperature) and the amplitude ΔT of the stepwise change in the target rotational phase were used as the parameters for changing the delay time (the parameters used for estimating the response delay period). However, it is also possible to use only one of these parameters or a combination of any two.

With the variable valve timing mechanism 6 of the present embodiment, as described above, no oil is supplied to the front side of the plunger 24 while the target phase advance value is on the maximum phase retard side, oil only being supplied to the rear side of the plunger. As a result, if the oil drains from the front side hydraulic chamber during the engine is stopped, then after engine start-up, if the target phase advance value is not set further toward the phase advance direction than the maximum phase retard position, then the front side will remain drained of oil.

Figure 9:
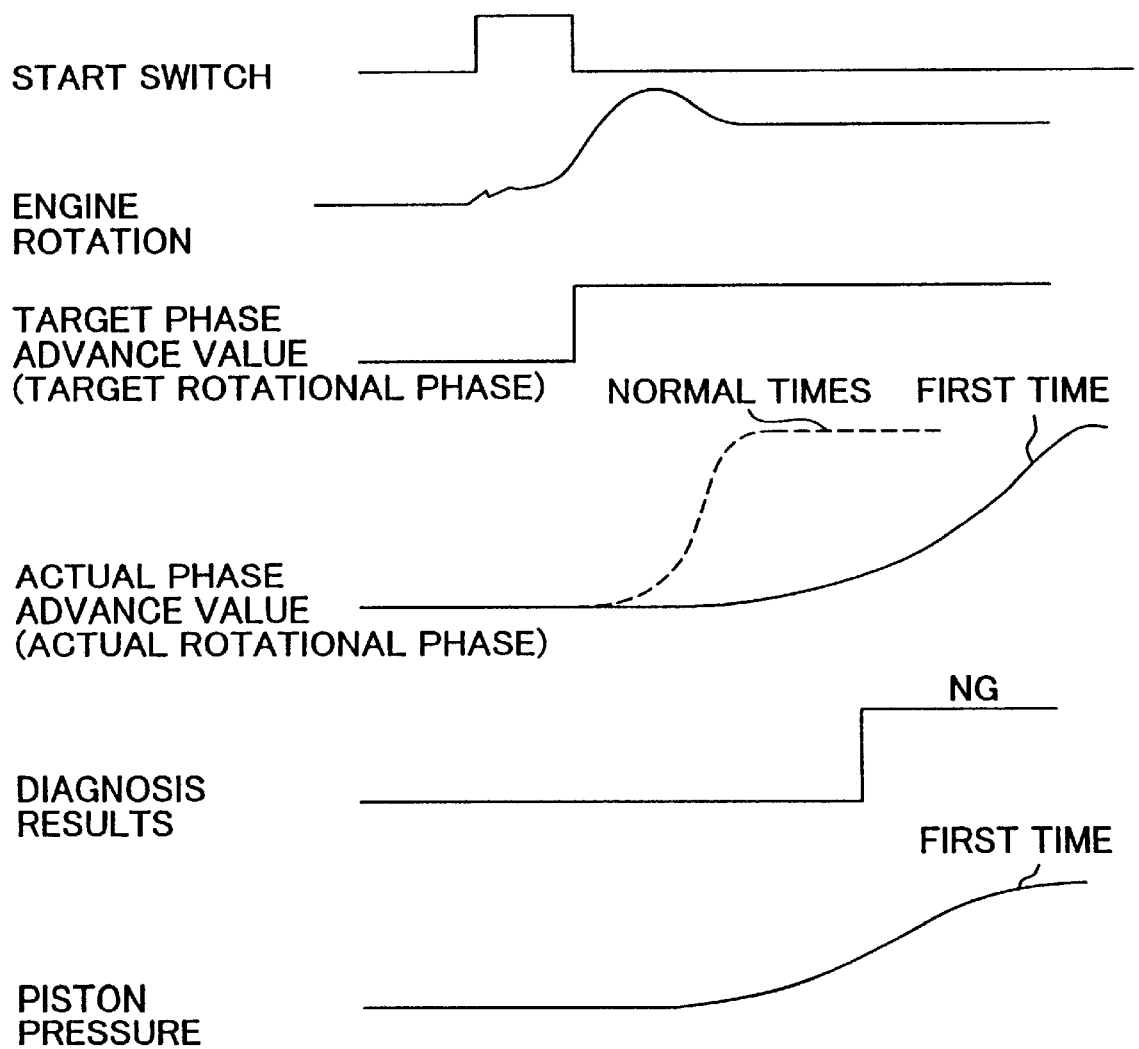
FIG. 9 is a time chart showing response characteristics at a first change in a target after engine start-up.

Consequently, when the first phase advance command (change in the target rotational phase) following engine start-up is output and the supply of oil to the front side is initiated, there is a need to fill the front side hydraulic chamber where the oil has drained out with oil, and so the response delay time from the output of the phase advance command until when the valve timing is actually advanced is longer than normal (refer to FIG. 9).

Figure 10:
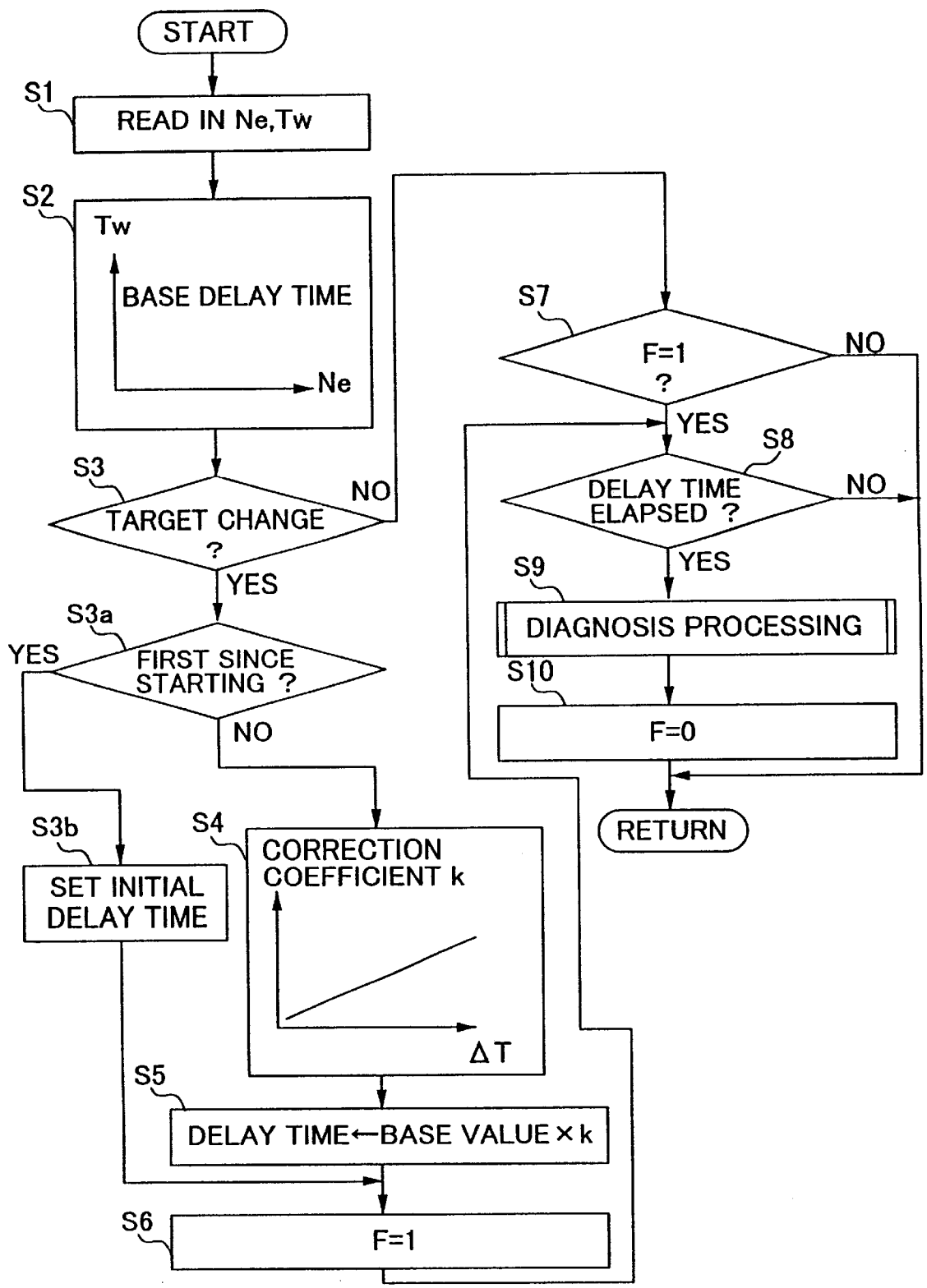
FIG. 10 is a flow chart showing the contents of the processing in a fault diagnosis of a second embodiment.

In this situation, as is shown in the flowchart in FIG. 10, a judgment can be made as to whether or not a change is the first target change following start-up, and the delay time can then be set accordingly.

In the flowchart of FIG. 10, with the exception of steps S3a and S3b, each step is the same as that shown in the flowchart of FIG. 5, and description thereof is thus omitted.

In the flowchart of FIG. 10, when a judgment is made at step S3 that a stepwise change of the target rotational phase (valve timing) has occurred, control proceeds to step S3a where a judgment is made as to whether or not the stepwise change of the target rotational phase is the first target change since engine start-up.

In the case where the target change is not the first such change since start-up, control proceeds to step S4 and succeeding steps, and as described above, a delay time is determined based on the engine rotational speed Ne, the cooling water temperature Tw (oil temperature) and the amplitude ΔT of the stepwise change in the target rotational phase, with diagnoses being prevented for the duration of the delay time from the point of the target change.

On the other hand, in the case where the target change is the first change since start-up, control proceeds to step S3b where a pre-stored initial delay time is set.

The initial delay time is set as a sufficiently long time to enable the actual rotational phase to reach the target value even in the case where the oil has drained from the front side hydraulic chamber. Consequently even in the situation where the oil has drained from the front side hydraulic chamber during an engine stoppage, and the supply of oil to the front side is subsequently initiated for the first time, the conducting of a diagnosis during the oil filling process can be avoided, and the occurrence of a misdiagnosis prevented.

In the above description a construction is used wherein a pre-stored fixed value is used as the delay time for the case where the target change is the first such change since start-up. However, it is also possible to increasingly correct the normal delay time set at step S5.

In the above description, diagnoses are prohibited only for the time required for filling with oil of a hydraulic chamber from which the oil has drained out during an engine stoppage. However, because the filling process can also be detected based on the oil pressure in the hydraulic chamber, a construction such as that shown in FIG. 1 is also possible, wherein an oil pressure sensor 33 is provided for detecting the oil pressure at the front side hydraulic chamber, and diagnoses are prohibited when a judgment is made, based on the detection results from the oil pressure sensor 33, that filling of the chamber with oil equivalent amount of drained oil is in progress.

Figure 11:
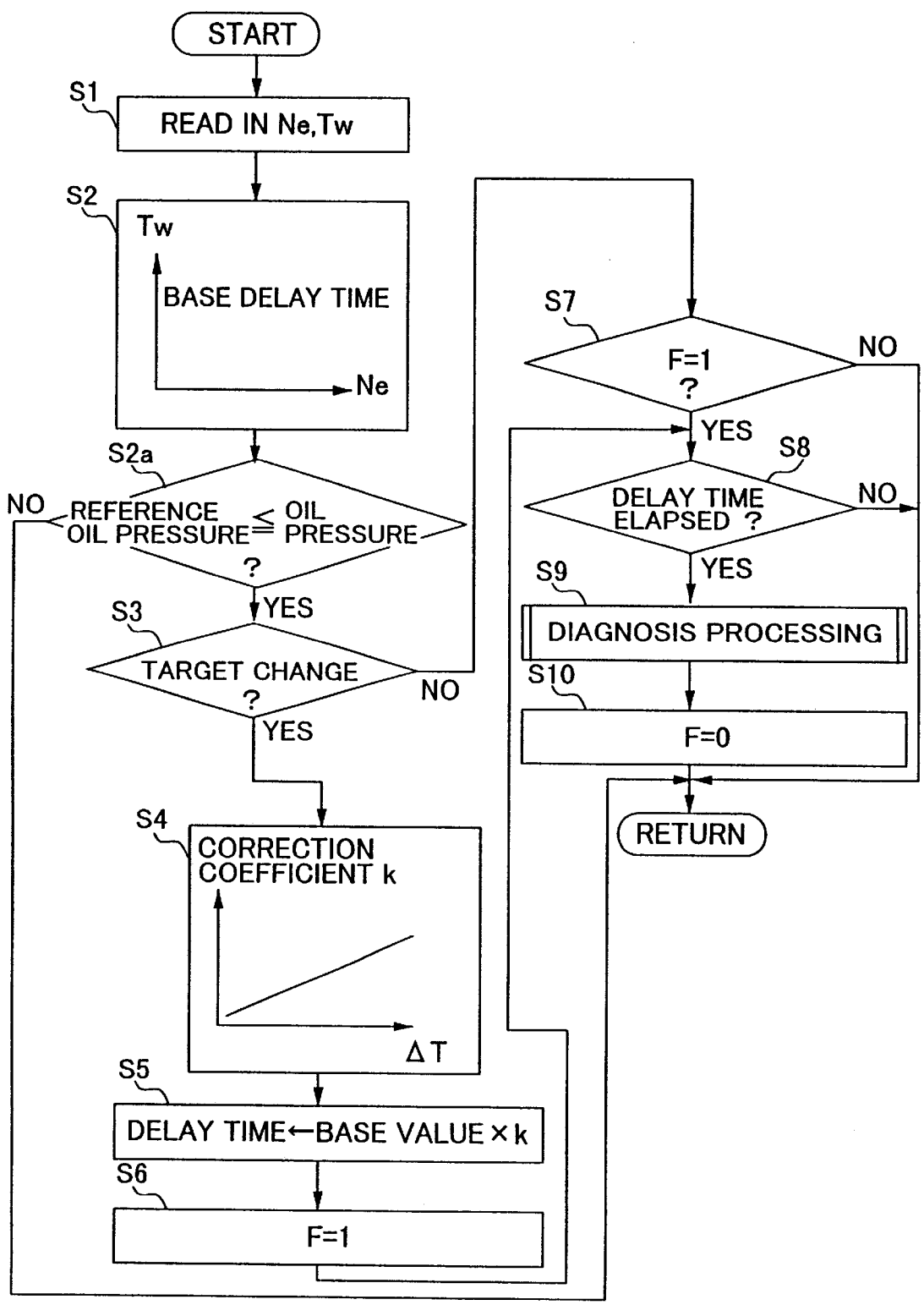
FIG. 11 is a flow chart showing the contents of the processing in a fault diagnosis of a third embodiment.

The flowchart of FIG. 11 shows the elements of a diagnosis which uses the oil pressure sensor 33. With the exception of step S2a, each step is the same as that shown in the flowchart of FIG. 5 and hence description thereof is omitted.

In the flowchart of FIG. 11, a judgment is made at step S2a as to whether or not the front side oil pressure detected by the oil pressure sensor 33 equals to or exceeds a reference oil pressure.

The reference oil pressure can be a constant value, but it is also possible to have a variable value which is set in accordance with the target phase advance value (target rotational phase), namely in accordance with the target oil pressure.

If the oil pressure at the front side detected by the oil pressure sensor 33 is less than the reference oil pressure value, then the routine ends and fault diagnoses are prohibited (diagnosis prohibition device), whereas if the oil pressure at the front side detected by the oil pressure sensor 33 equals to or exceeds the reference oil pressure value then control proceeds to step S3 and succeeding steps where a fault diagnosis is conducted in the same manner as that described above.

With the above construction, when the oil has drained from the front side hydraulic chamber during an engine stoppage and then a first phase advance command following engine start-up results in an initiation of oil supply to the front side, diagnoses can be reliably prohibited while the oil drained state is rectified. The possibility is thus avoided of a diagnosis being conducted during the delay time required for oil filling, which would result in a misdiagnosed fault based on a difference between the actual rotational phase and the target value due to a response delay.

It is also possible to have a construction wherein a judgment as to whether or not a diagnosis is to be prohibited based on the oil pressure is made only when the first phase advance command following a start-up is output.

What we claimed are:

1. An apparatus for diagnosing a hydraulic variable valve timing mechanism which changes a rotational phase of a cam shaft with respect to an engine crank shaft by oil pressure to thereby change a valve timing, said apparatus comprising:

phase detection means for detecting said rotational phase;

diagnosis means for comparing the rotational phase detected by said phase detection means with a target value for said rotational phase to diagnose a fault of said hydraulic variable valve timing mechanism and then outputting a fault judgment signal;

estimation means for estimating a time period for where a response delay in the rotational phase occurs with respect to the change in said target value in accordance with operating conditions; and diagnosis prohibition means for prohibiting diagnosis by said diagnosis means for the duration of the time period for where said response delay estimated by said estimation means occurs.

2. An apparatus for diagnosing a hydraulic variable valve timing mechanism according to claim 1, wherein said estimation means estimates the time period required for the rotational phase to reach said target value following a change of said target value, in accordance with the rotational speed of the engine.

3. An apparatus for diagnosing a hydraulic variable valve timing mechanism according to claim 1, wherein said estimation means estimates the time period required for the rotational phase to reach said target value following a change of said target value, in accordance with the temperature of the hydraulic fluid.

4. An apparatus for diagnosing a hydraulic variable valve timing mechanism according to claim 1, wherein said estimation means estimates the time period required for the rotational phase to reach said target value following a change of said target value, in accordance with the amplitude of the change in said target value.

5. An apparatus for diagnosing a hydraulic variable valve timing mechanism according to claim 1, wherein said estimation means estimates the time period required for the rotational phase to reach said target value following a change of said target value, based on whether or not the change in said target value is the first change following start-up of the engine.

6. An apparatus for diagnosing a hydraulic variable valve timing mechanism according to claim 1, wherein said estimation means estimates the time period required for the oil pressure inside the hydraulic chamber of said hydraulic variable valve timing mechanism to exceed a reference oil pressure as a time period during which a response delay occurs.

7. An apparatus for diagnosing a hydraulic variable valve timing mechanism according to claim 1, wherein said diagnosis means finally diagnoses the occurrence of a fault in the variable valve timing mechanism and outputs a fault judgment signal, only when greater than or equal to a predetermined number of fault judgments are made consecutively.

8. An apparatus for diagnosing a hydraulic variable valve timing mechanism according to claim 7, wherein said phase detection means comprises:

a cam sensor which receives a plurality of rotational signals for each cycle from the cam shaft;

a crank angle sensor which receives a rotational signal from the crank shaft; and phase difference detection means for detecting a phase difference between the rotational signal from said cam sensor and the rotational signal from said crank angle sensor.

9. An apparatus for diagnosing a hydraulic variable valve timing mechanism according to claim 7, wherein said diagnosis means comprises:

count up means which increases a counter each time a fault judgment occurs; and clearing means for clearing said counter when a normal judgment is obtained, and a fault judgment signal is output only when the value of said counter equals to or exceed a predetermined value.

10. An apparatus for diagnosing a hydraulic variable valve timing mechanism which changes a rotational phase of a cam shaft with respect to an engine crank shaft by oil pressure to thereby change the valve timing, said apparatus comprising:

phase detection means for detecting said rotational phase; and diagnosis means for comparing the rotational phase detected by said phase detection means with a target value for said rotational phase to diagnose a fault of said hydraulic variable valve timing mechanism and then outputting a fault judgment signal, wherein said diagnosis means diagnoses the occurrence of a fault in the variable valve timing mechanism and outputs a fault judgment signal, only when greater than or equal to a predetermined number of fault judgments are made consecutively.

11. An apparatus for diagnosing a hydraulic variable valve timing mechanism according to claim 10, wherein said phase detection means comprises:

a cam sensor which receives a plurality of rotational signals for each cycle of the cam shaft; and a crank angle sensor which receives a rotational signal from the crank shaft; and phase difference detection means for detecting a phase difference between the rotational signal from said cam sensor and the rotational signal from said crank angle sensor.

12. An apparatus for diagnosing a hydraulic variable valve timing mechanism according to claim 10, wherein said diagnosis means comprises:

count up means which increases a counter each time a fault judgment is made, and clearing means for clearing said counter when a normal judgment is obtained, and a fault judgment signal is output only when the value of said counter equals to or exceeds a predetermined value.

13. A method of diagnosing a hydraulic variable valve timing mechanism which changes the rotational phase of a cam shaft with respect to an engine crank shaft by oil pressure to thereby change a valve timing, said method comprising the steps of:

detecting said rotational phase;

comparing a detection value for said rotational phase with a target value for said rotational phase;

outputting a fault judgment signal for said hydraulic variable valve timing mechanism based on a result of said comparison;

estimating a time period for where a response delay in the rotational phase occurs with respect to a change in said target value in accordance with operating conditions; and prohibiting output of said fault judgment signal during the time period where said estimated response delay occurs.

14. A method of diagnosing a hydraulic variable valve timing mechanism according to claim 13, wherein a response delay period required for the rotational phase to reach said target value following a change of said target value, is estimated in accordance with the rotational speed of the engine.

15. A method of diagnosing a hydraulic variable valve timing mechanism according to claim 13, wherein a response delay period required for the rotational phase to reach said target value following a change of said target value, is estimated in accordance with the temperature of the hydraulic fluid.

16. A method of diagnosing a hydraulic variable valve timing mechanism according to claim 13, wherein a response delay period required for the rotational phase to reach said target value following a change of said target value, is estimated in accordance with the amplitude of the change in said target value.

17. A method of diagnosing a hydraulic variable valve timing mechanism according to claim 13, wherein a response delay period required for the rotational phase to reach said target value following a change of said target value, is estimated based on whether or not the change in said target value is the first change following start-up of the engine.

18. A method of diagnosing a hydraulic variable valve timing mechanism according to claim 13, wherein the time period required for the oil pressure inside the hydraulic chamber of said hydraulic variable valve timing mechanism to exceed a reference oil pressure is estimated as a time period during which a response delay occurs.

19. A method of diagnosing a hydraulic variable valve timing mechanism according to claim 13, wherein the occurrence of a fault in the variable valve timing mechanism is finally diagnosed and a fault judgment signal is output, only when greater than or equal to a predetermined number of fault judgments are made consecutively.

20. A method of diagnosing a hydraulic variable valve timing mechanism according to claim 19, wherein there is provided;

a cam sensor which receives a plurality of rotational signals for each cycle from the cam shaft, and a crank angle sensor which receives a rotational signal from the crank shaft, and a phase difference between the rotational signal from said cam sensor and the rotational signal from said crank angle sensor is detected as said rotational phase.

21. A method of diagnosing a hydraulic variable valve timing mechanism according to claim 19, said method comprising the steps of:

increasing a counter each time a fault judgment is made;

clearing said counter when a normal judgment is obtained; and outputting a fault judgment signal only when the value of said counter equals to or exceeds a predetermined value.

22. A method of diagnosing a hydraulic variable valve timing mechanism which changes the rotational phase of a cam shaft with respect to an engine crank shaft by oil pressure to thereby change a valve timing, said method comprising the steps of:

detecting said rotational phase;

diagnosing a fault in said hydraulic variable valve timing mechanism from the results of comparing a detection value for said rotational phase with a target value for said rotational phase; and outputting a fault judgment signal when greater than or equal to a predetermined number of fault judgments are made consecutively.

23. A method of diagnosing a hydraulic variable valve timing mechanism according to claim 22, wherein there is provided;

a cam sensor which receives a plurality of rotational signals for each cycle from the cam shaft, and a crank angle sensor which receives a rotational signal from the crank shaft, and a phase difference between the rotational signal from said cam sensor and the rotational signal from said crank angle sensor is detected as said rotation phase.

24. A method of diagnosing a hydraulic variable valve timing mechanism according to claim 22, said method comprising the steps of:

increasing a counter each time a fault judgment is made;

clearing said counter when a normal judgment is obtained; and outputting a fault judgment signal only when the value of said counter equals to or exceeds a predetermined value.

* * * * *